United States Patent [19]

Milovanovich

[11] Patent Number: 5,060,009
[45] Date of Patent: Oct. 22, 1991

[54] METHOD AND APPARATUS FOR THE AUTOMATED IMAGE FORMATION ON ANY PHOTOGRAPHIC MEDIA

[75] Inventor: André Milovanovich, Saint Sauveur, France

[73] Assignee: Caisse Regional de Credit Agricole Mutuel de L'yonne, France; a part interest

[21] Appl. No.: 499,508

[22] PCT Filed: Oct. 24, 1989

[86] PCT No.: PCT/FR89/00554
§ 371 Date: Jun. 26, 1990
§ 102(e) Date: Jun. 26, 1990

[87] PCT Pub. No.: WO90/04809
PCT Pub. Date: May 3, 1990

[30] Foreign Application Priority Data

Oct. 26, 1988 [FR] France .................................. 88 14095

[51] Int. Cl.⁵ .............................................. G03B 27/32
[52] U.S. Cl. ............................................ 355/27; 271/33
[58] Field of Search ............................. 355/27; 271/33

[56] References Cited

U.S. PATENT DOCUMENTS

| | | | |
|---|---|---|---|
| 3,262,697 | 7/1966 | Krinke | 271/33 |
| 3,857,560 | 12/1974 | Gundlach | 271/33 |
| 4,185,912 | 1/1980 | Schwartz. | |
| 4,461,468 | 7/1984 | Peter et al. | 271/33 |

Primary Examiner—Monroe H. Hayes
Attorney, Agent, or Firm—William A. Drucker

[57] ABSTRACT

According to the method of the invention, photographic media are transported from one treatment station to another by means of a conveyor belt (1) on which they are held by temporary adhesion by using adhesive means, said media (10) being then removed from the belt by means of an extractor (9). The adhesive means have, with respect to the belt (1), an adhesive power different from the adhesive power they have with respect to the medium (10), so that, during the extraction phase, they remain either on the belt (1) or on the medium (10), according to the desired aim. The invention allows to improve the performances and to extend the application fields of apparatuses using the transfer principle by conveyor belt with temporary adhesion.

26 Claims, 2 Drawing Sheets

METHOD AND APPARATUS FOR THE AUTOMATED IMAGE FORMATION ON ANY PHOTOGRAPHIC MEDIA

The invention relates to a method and apparatus for automated image formation on any photographic medium.

Generally, numerous techniques have already been proposed for such formation, among which will only be mentioned:

the technique of instantaneous photography with reduced format, using relatively simple mechanisms; and techniques used by development laboratories for professional use (central photographic laboratories, automatic photographic mini-laboratories, automatic apparatus for identity photos, machines, colour photocopiers on photographic paper), these machines using relatively complex and expensive mechanisms, such as rollers, gears etc.

According to these techniques for professional use, the sensitive paper is delivered in the form of rolls, which involves the use of a mechanism for advancing the paper and cutting to the format, an exposure system operating while the paper is stopped, etc.

Solutions have also been proposed, particularly by the international patent application PCT/FR 88/00336, filed in the names of the Applicants, for automated photographic image formation by machines with reduced mechanisms, in which the displacements of the sensitive surfaces from one treatment station to another are effected by means of a transporter belt on which the photographic sensitive surfaces are held by temporary adhesion. According to the above patent, this temporary adhesion is obtained by means of a permanent adhesive covering said photographic medium at least partially, or even by suction means equipping the belt. Thus, it is possible to solve in a particularly simple way the problem of movement of the sensitive medium inside the apparatus, the medium consisting either of photographic films or papers with a sensitive photographic surface. This simplification is increased by at least one of the following devices:

the use of a flash for exposing the sensitive surfaces;

the use of a transporter belt, enclosed initially inside cartridge, and on which the sensitive surfaces are previously disposed and adhere, as well possibly as containers containing the treatment products to be used;

the use of means for vaporizing the chemical treatment on the sensitive surfaces;

the use of a photographic apparatus associated with a light source for printing the sensitive surfaces.

In the above patent, the sensitive surfaces are in contact with lower rollers (emulsion against the rollers) and therefore, under the effect of too high a pressure, an impurity may penetrate into the photographic emulsion, which may be troublesome in the search for very high quality and the use of very high temperatures, or the delivery of prints in ultra short times. Furthermore, in the case of a prolonged stoppage of the machine, at night for example, adhesive may be deposited on the lower rollers. Finally, in the case where the paper is made adhesive on its back and the transporter belt non adhesive, at the output of the machine a self-adhesive photograph is obtained, which is not always desirable.

The purpose of the invention is then more particularly not only to solve the above outlined problems but further to increase the performances and extend the fields of application of apparatus using the principle of transfer by transporter belt with temporary adhesion.

For this, it provides a method for the automated formation of images on photographic media, in which the photographic medium is transported from one treatment station to another by means of a transporter belt on which said medium is held by temporary adhesion by adhesive means, the medium then being extracted from the belt by means of an extractor.

According to the invention, this method is characterized in that said adhesive means have, with respect to the belt, an adhesive power different from the adhesive power which it has with respect to the medium, so that during the extraction phase, the adhesive means remain either on the belt, or on the medium depending on the desired aim.

The adhesive means may be initially carried by the medium or by the belt. They will be adapted so as to remain on the belt or transferred to the medium (self-adhesive photos) during the extraction phase.

The difference of adhesive power of these adhesive means may be due to properties of adhesion (surface states) of the belt or of the medium.

Advantageously, said adhesive will consist of a double face adhesive comprising a flat substrate with two adhesive coatings having different adhesive powers, one of these coatings possibly consisting of a repositionable adhesive layer.

In some applications, the adhesive means may be in the form of one or more adhesive tracks or even in the form of a double face adhesive patch (possibly with different adhesive powers, for example appropriate to films and to sensitive papers).

Furthermore, in the case of photographic machines with an adhesive transporter belt and non adhesive paper, or in the case of adhesive paper and non adhesive belt, the contact between the sensitive surface and the transporter belt must take place in the absence of humidity. To overcome this problem, the invention proposes either using a compartment in which separate loading takes place through a lock of the developer, or using a vapour extractor, which techniques are known in both cases. Furthermore, a number of photographic papers do not adhere correctly to the adhesive belt and do not allow suitable adhesion to be obtained during transport through chemical products. The invention therefore proposes for this a slight abrasion by abrasive means of the plasticised back of the sensitive photographic surfaces, without removing this protective plastic. Such light abrasion of the sensitive surfaces may be made in the factory, or even in the machine. In the case of using a roll of paper of a certain length containing several images, slight scratching in the machine at the beginning of the strip is sufficient.

Of course, the invention also relates to the apparatus for implementing the above defined method and embodiments of which will be described hereafter, with reference to the accompanying drawings in which.

Figure 1:
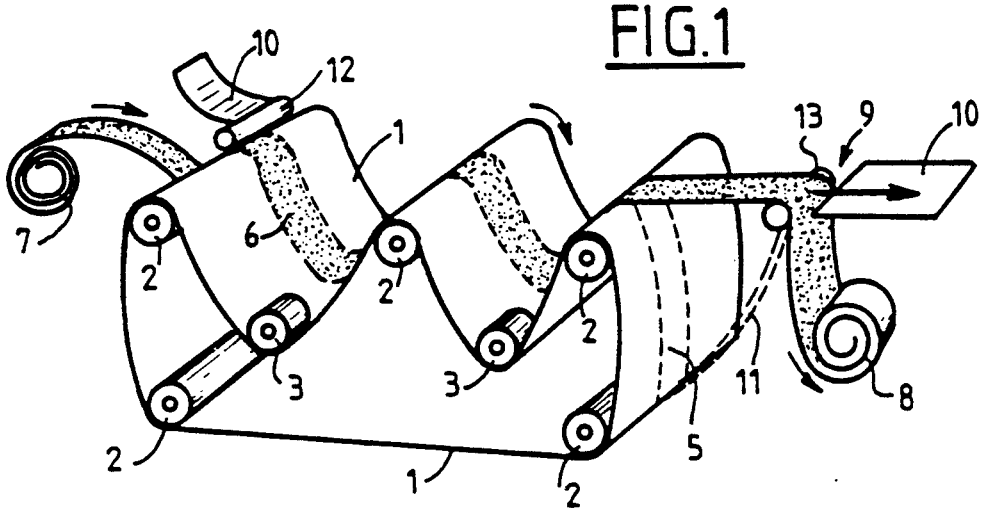
FIG. 1 is a schematic perspective view of a transmission device which can be used in a development apparatus according to the invention.

Such as shown in FIG. 1, the transmission device comprises a transporter belt 1 made from a semi-rigid thin material, which travels in a closed loop and is guided by inner rollers 2 which extend over the whole width of the belt 1 and outer rollers 3 of small width which only bear on the lateral edges of belt 1.

Thus, the central portion 5 of the external face of belt 1 (which forms the useful part thereof) is not urged by the outer rollers 3, even in the zone where wet treatments take place. A double face adhesive strip 6, for retaining the sensitive surfaces to be treated, adheres in this central portion 5 (on one or more zones or lines).

This adhesive strip 6 may follow a path:

in an open loop: in this case it comes from a feed reel 7, follows a part of the path of belt 1 in the centre of which it adheres temporarily and is then wound on a takeup reel 8 after passing through a device 9 for extracting the sensitive surfaces 10 which it supports;

in a closed loop: strip 6 following exactly the path of belt 1; or in a combined loop: strip 6 following partially the path of belt 1 then moving away therefrom to then adhere thereto again, for example after passing through the station 9 for extracting the sensitive surfaces 10 (path shown with broken lines 11).

In this example, the sensitive surfaces 10 are applied to the adhesive strip 6 by a presser roller 12 made from a non adhesive material, for example from silicon. Extractor 9 is made from a roller 13 with small radius over which the adhesive strip 6 passes.

Of course, the invention is not limited to the above described embodiment. The adhesive strip 6 could be possibly omitted and replaced by adhesive means initially deposited on the back of the sensitive surfaces 10.

Figure 2:
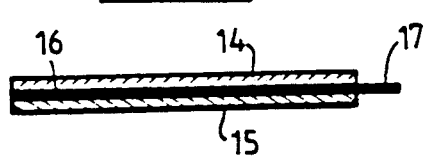
FIG. 2 is a schematic vertical section of a double face adhesive, whose two faces have a different adhesive power.

These adhesive means may for example consist, as shown in FIG. 2, of a double face adhesive having a support strip 16, on each side of which are deposited respectively two adhesive layers 14, 15 having different adhesive powers. In the case where it is desired to have self-adhesive photos, the adhesive layer 14 adhering to the back of the sensitive surfaces will have a higher adhesive power than that of the other layer 15 so that, during the extraction phase, the double face adhesive remains bonded to the back of the sensitive surface 10 and not to the transporter belt. An opposite arrangement will be used in the case where it is not desired to obtain self-adhesive photos.

In the example shown in FIG. 2, substrate 16 is wider than the two adhesive layers 14, 15 so that there exists a lateral non adhesive tongue 17 for extracting the whole of the adhesive from the medium where it is fixed.

Figure 3:
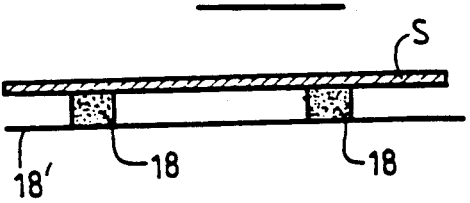
FIG. 3 is a schematic view of a sensitive photographic surface comprising two adhesive strips on the back.
Figure 4:
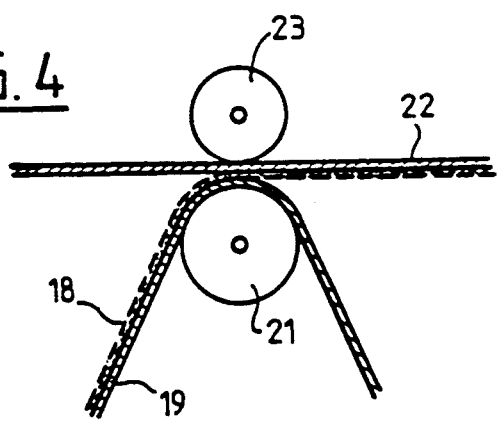
FIG. 4 is a schematic representation of a device for laying adhesive strips on the back of the sensitive surfaces at the input of a machine, on papers or films.

FIG. 3 shows one embodiment, in which the adhesive means consist of two adhesive tracks 18 deposited on the back of a sensitive surface S and protected, particularly for storage in a reel, by a non adhesive track 18' protecting the sensitive surfaces. These tracks may be laid according to the embodiment illustrated in FIG. 4 in which a non adhesive strip 19 carrying the two adhesive tracks 18 passes round a roller 21 against which the sensitive medium is applied, here in the form of a strip 22, under the effect of a second roller 23. During their passage between the two rollers 21, 23, the backs of the sensitive surfaces 22 are compressed on the two adhesive tracks 18, the adhesive power of the two tracks 18 being greater on medium 22 than on strip 19. On leaving the rollers, the adhesive tracks remain stuck to the back of the sensitive surfaces 22 which may then be introduced into a development machine, whereas strip 19 may be wound on a take-up reel (not shown).

Figure 5:
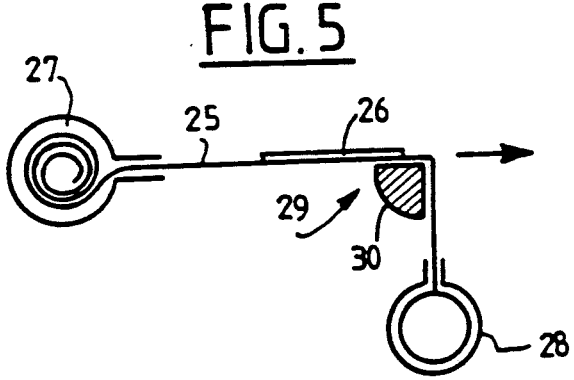
FIGS. 5 and 6 are schematic views of a device for extracting the sensitive surfaces adhering to a transporter belt (extraction position shown in FIG. 5) or for allowing the transfer of the sensitive surfaces to a storage station (transfer position shown in FIG. 6)
Figure 6:
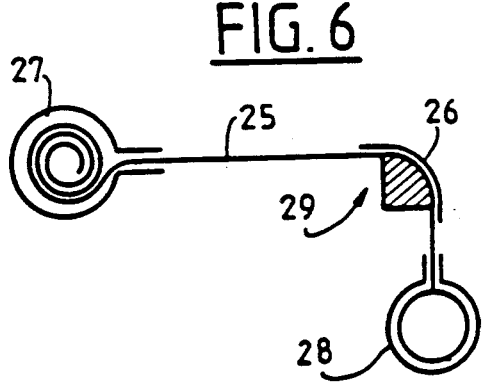

FIGS. 5 and 6 illustrate the principle of a dual function extractor which can be used in an apparatus according to the invention.

In this example, the transporter belt 25 which supports the sensitive surfaces 26, initially wound inside a feed cartridge 27, is connected to a take-up reel 28 at the end of a path passing through the dual function extractor 29. The latter is formed by a prismatic guide piece 30 having a section in the form of a rectangular triangle whose hypotenuse is curved.

This guide piece causes a 90° change of direction of belt 25:

either with the angle of intersection situated on the right angle side, in which case extraction of the medium 26 is obtained (extraction position shown in FIG. 5);

or with the curved portion forming the hypotenuse, in which case no extraction occurs and the sensitive surfaces 26 carried by belt 25 are wound therewith in the take-up reel 28 (transfer position shown in FIG. 6).

Figure 7:
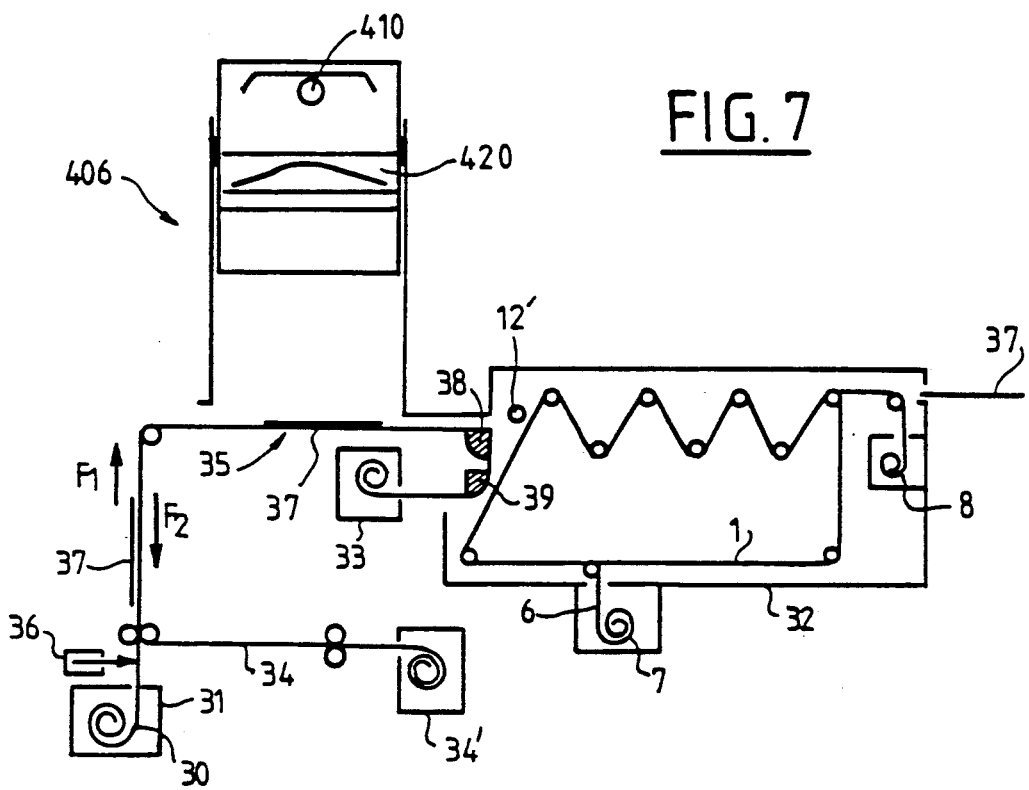
FIG. 7 is a schematic representation of a developer using the arrangements illustrated particularly in FIGS. 1, 5 and 6.

FIG. 7, which illustrates this feature, shows a developer in which the sensitive surfaces which are initially in the form of a strip 30 wound in a cartridge 31, may be brought to a developing station 32 or to a take-up reel 33 by means of a first transporter belt 34 coming from a reel 34' and passing through an exposure station 35. On leaving cartridge 31, strip 30 may be cut by means of an electric cutting device 36, so as to obtain unitary sensitive surfaces 37 intended to be developed immediately after exposure. On leaving the exposure station 35, the sensitive surfaces are directed towards the developer 32 or towards the reel by means of a dual function extractor 38 of the type described above.

With the above described structure, the developer has a very great flexibility of use and allows the operator to use successively:

a first operating mode, in which the sensitive surfaces 37 are exposed unit by unit and are developed immediately after exposure (the belt travelling in the direction of arrow F1);

a second operating mode, in which the sensitive surfaces 37 (possibly in the form of strips 30) are exposed at a high rate, then are wound on reel 33 so as to pass again rapidly if required to the first operating mode after winding in the opposite direction in cartridge 31.

The operator may then readily make exposure adjustment tests before proceeding to series printing with instantaneous or even delayed development.

In the above described example, the exposure station 35 comprises an enlarger structure 400 of conventional design, whose light source consists of an assembly comprising an electronic flash lamp 410 and an opal diffuser 420 designed so as to homogenize the light flux transmitted to the enlarger (transmissive power increasing from the centre to the periphery). An orange filter (or a combination of filters producing the same effects) may be further added so as to simplify the focusing of the filtering.

The development station 32 has a structure similar to that shown in FIG. 1. This is why the same references have been used for similar elements.

A very important advantage of the above described arrangements and, in particular, of the method of transferring the sensitive surfaces, is that they considerably reduce the complexity, dimensions, weight and cost of the apparatus for forming the images or reproductions, such as developers or photocopiers, and more generally assemblies for treating sensitive surfaces, developing films and/or making enlargements.

With these advantages and this transfer mode, it becomes possible to dispose such apparatus in unusual places, in particular on the ceiling, under a floor, or even above commercial gondola, so as to free as much as possible the ground space of the premises.

Figure 8:
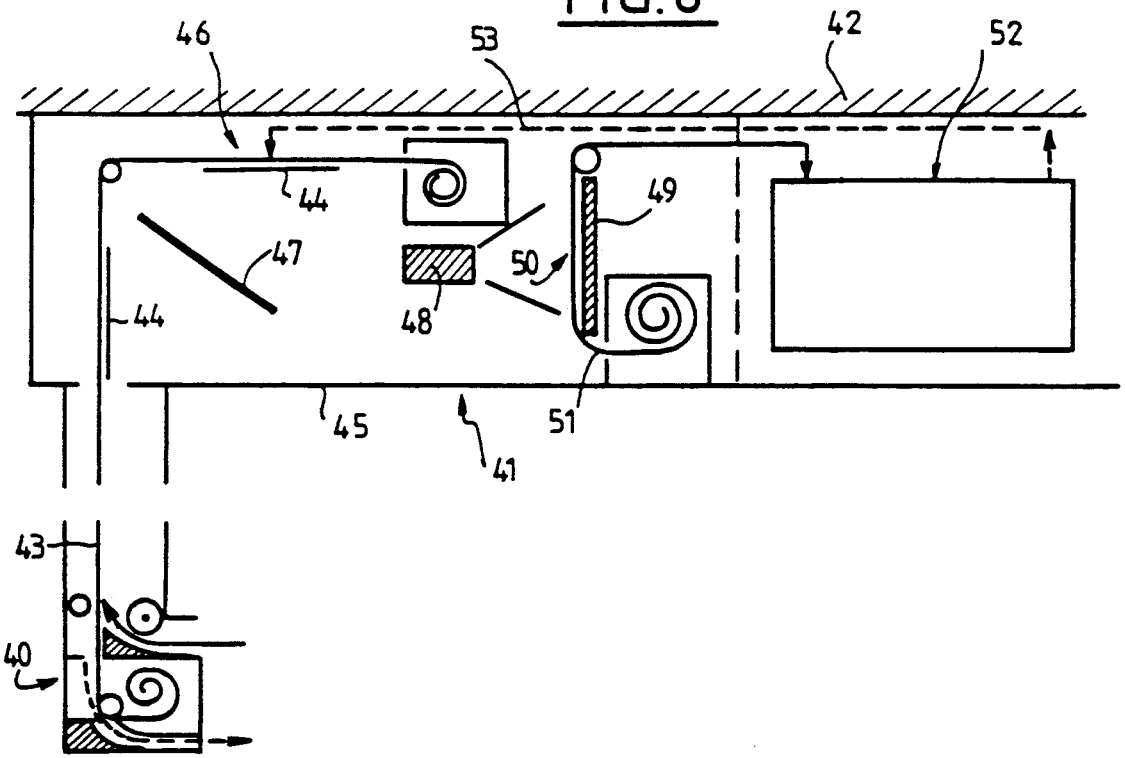
FIG. 8 is a schematic view of a ceiling mounted photocopier.

One embodiment of an apparatus of this type may for example, as shown in FIG. 8, comprise:

a station 40 for loading the document to be reproduced, situated in a position readily accessible to the user;

a modular reproduction apparatus 41 mounted on the ceiling 42 or possibly in the space between the ceiling and the floor;

and adhesive strip transfer device 43 for transmitting the documents 44 introduced into the loading station 40; and a station for controlling the machine situated in a position readily accessible to the user.

In this example, the reproduction apparatus 41 comprises an exposure module 45 in which the image of the document 44 to be reproduced, which is then immobilized in a presentation area 46 is projected, after reflection from a mirror 47, by an objective 48 on to a sensitive surface 49 situated in an exposure plane 50.

The sensitive surface 49 mounted on a transporter belt 51 by temporary adhesion is transmitted, after exposure, to a development station 52 then to a distribution station (not shown) situated preferably in the immediate vicinity of the loading station 40.

Advantageously, the loading station 40 and the distribution station will merge, the sensitive surface 49 once developed returning, with the document to be reproduced, on the same transporter belt 43 (the two documents 44, 49 adhering for example on each side of belt 43).

In this case, means (similar to the above described extractors) must be provided for transferring the sensitive surface 49 carried by belt 51, at the output of the development station 52, to the transporter belt 43 (connection shown with broken lines 53).

This embodiment has the advantage of being able to be installed in heavily congested public places.

Of course, the invention is not limited to such an embodiment.

Thus, for example, the generalized use of a transfer system by temporary adhesion on a transporter belt makes it possible to combine the image formation procedure with other procedures so as to obtain a more elaborate or more complex product.

It becomes possible for example to construct an automatic machine delivering,, for example, transport cards with a photo on safety paper.

I claim:

1. Apparatus for an automated formation of images on photographic media, said apparatus comprising a transporter belt on which said media are placed by a distributor and temporarily fixed by adhesive means, treatment stations through which said media are successively transported by the belt, and an extractor for extracting said media from said belt, wherein:
   i. said belt has a supporting surface having with said adhesive means a first adhesive power;
   ii. said media each comprises a back surface which is fixed on said supporting surface and which has with said adhesive means a second adhesive power different from said first adhesive power;
   iii. said adhesive means are initially placed on the surface having the lower adhesive power so as to be selftransferred by the extractor on the surface having the greatest adhesive power.

2. Apparatus according to claim 1, wherein the adhesive means are initially carried by said media and are transferred on the belt by the extractor.

3. Apparatus according to claim 1, wherein the adhesive means are initially carried by the belt and are transferred to said media by the extractor.

4. Apparatus according to claim 1, wherein the difference of adhesive power of the adhesive means is due to the state of the supporting surface of the belt and that of the back surface of the media.

5. Apparatus according to claim 4, wherein one of said surfaces is previously abraded.

6. Apparatus according to claim 1, wherein said adhesive means consist of a double face adhesive comprising a flat substrate having its two faces two respective adhesive coatings having different adhesive powers.

7. Apparatus according to claim 6, wherein one of the adhesive coatings is of repositionable type, whereas the other coating is made from an adhesive with higher adhesive power.

8. Apparatus according to claim 6, wherein said substrate (16) extends beyond said adhesive coatings so as to form a non adhesive tongue (17).

9. Apparatus according to claim 1, wherein said adhesive means are of double face type and are in the form of a patch.

10. Apparatus according to claim 1, wherein said adhesive means are carried by the medium and are initially protected by a non adhesive film.

11. Apparatus according to claim 1, wherein the transporter belt travels in a closed loop and is guided by inner rollers which extend over the whole width of the belt and outer rollers of small width which only bear on the lateral edges of the belt, and a double face adhesive strip which serves for retaining said media adheres to the central portion of said belt.

12. Apparatus according to claim 11, wherein said double face adhesive strip comes from a feed reel, adheres temporarily to the belt and is then wound on a take up reel after passing through a device for extracting said media.

13. Apparatus according to claim 11, wherein said double face adhesive strip follows a closed loop with said transporter tape.

14. Apparatus according to claim 6, wherein the substrate is wider than the two adhesive coatings so that there exists a lateral non adhesive from the medium where it is fixed.

15. Apparatus according to claim 1, wherein said transporter belt is of the closed loop type, and in that said adhesive means consist of an adhesive strip of double face type with dual adhesive power.

16. Apparatus according to claim 1, wherein said transporter belt has several adhesive tracks with different adhesive powers.

17. Apparatus according to claim 1, wherein the face of the media adhering to the transporter belt is abraded before being mounted on the adhesive transporter belt.

18. Apparatus according to claim 1, wherein said media are made from a paper containing a plasticizer.

19. Apparatus for an automated formation of images on photographic media, said apparatus comprising at least one transporter belt coming from a feed reel and being wound on a take-up reel, this transporter belt following, between these two reels, a path passing through an exposure station, and a device for extracting the said media disposed between said station and said take-up reel this extraction device having two positions, namely: an "extraction" position in which the media are extracted from the belt and transmitted to a development apparatus and a "transfer" position in which the media are transferred to the take-up reel.

20. Apparatus according to claim 19 wherein said extraction device comprises a prismatic guide piece having a section in the form of a rectangular triangle having a right angle edge and whose hypotenuse is curved, this guide piece being disposed so as to cause an angular change of direction of the transporter belt
  through the right angle edge, for extracting said media,
  and through the curved portion forming the hypotenuse for transferring said media.

21. Apparatus according to claim 19, wherein the exposure station comprises an enlarger structure whose light source comprises an electronic flash and an opal diffuser designed so as to homogenize the light flux emitted by said light source.

22. Apparatus according to claim 19, which comprises:

a station for loading a document to be reproduced, situated in a position readily accessible to the user;
  a modular reproduction apparatus mounted on a ceiling or possibly in a space between the ceiling and a floor;
  an adhesive strip transfer device for transmitting to the apparatus the document introduced into the loading station; and
  a device for controlling and monitoring the machine.

23. Apparatus according to claim 22, wherein the reproduction apparatus comprises an exposure module in which the image of the document to be reproduced, which is then immobilized on the adhesive strip in a presentation area is projected, after reflection from a mirror, by an objective on to a sensitive surface situated in an exposure plane.

24. Apparatus according to claim 23, wherein the sensitive surface mounted on the adhesive strip by temporary adhesion is transmitted, after exposure, to a development station then to a distribution station preferably situated in the immediate vicinity of the loading station.

25. Apparatus according to claim 23, wherein the loading station and the distribution station merge, the sensitive surface, once developed, returning with the document to be reproduced on the same adhesive strip.

26. Apparatus for an automated formation of images on photographic media said apparatus comprising a transporter belt on which said media are placed by a distributor and temporarily fixed by adhesive means, and an extractor which comprises a guiding piece having two controllable positions, a first position, wherein the transporter belt is caused to follow a curved path with a small radium of curvature and said medium is extracted from said belt, and a second position, wherein the transporter belt is caused to follow a path with a greater radium of curvature without extraction of said media.

* * * * *